Feb. 27, 1962 E. R. KEELER 3,023,322

PULSE DIVIDING CIRCUIT

Filed July 5, 1960

INVENTOR.
EUGENE R. KEELER
BY [signature]
ATTORNEY

United States Patent Office 3,023,322
Patented Feb. 27, 1962

3,023,322

PULSE DIVIDING CIRCUIT

Eugene R. Keeler, Flushing, N.Y., assignor to General Precision, Inc., a corporation of Delaware Filed July 5, 1960, Ser. No. 40,915
3 Claims. (Cl. 307—88.5)

This invention relates generally to frequency dividing circuits and particularly to a circuit for generating two series of output pulses each having one half the repetition rate of a series of input pulses.

Pulse dividing circuits are useful in general whenever it is necessary to obtain a series of pulses the repetition rate of which is a submultiple of the repetition rate of a similar series of input pulses. One particular use for such a circuit occurs in those digital computers employing two series of timing pulses, sometimes called "clock" and "half clock" pulses. The "clock" pulses are a series of pulses having a substantially uniform repetition rate while the "half clock" pulses are a similar series having the same polarity and the same repetition rate but occurring in the middle of the time interval between successive clock pulses.

In the past, to obtain two such series of pulses, it has been customary to generate a signal at twice the desired repetition rate and to apply this series of pulses to a bistable multivibrator circuit comprising either two tubes or two transistors together with the necessary power supplies. However, such an arrangement is wasteful of power because in general no amplification action is required. All that is required is, in effect, a switch action which diverts odd numbered pulses to a first output channel and even numbered pulses to a second output channel.

It is an object of the present invention to provide a pulse diverting circuit which requires no power supply other than the input pulses.

Another object is to provide a circuit for diverting the odd numbered pulses of a series to one output channel and the even numbered pulses to another output channel.

Briefly stated, the invention comprises a transistor multivibrator circuit in which the usual power supply is omitted and replaced by the source of pulses to be divided. Upon receipt of the first pulse, the first transistor is rendered conductive allowing an output pulse to appear at the second transistor. Upon the passage of the first pulse, the first transistor is rendered incapable of conducting for a period of time depending upon the time constants of the circuits. If a second pulse is applied during this period, the second transistor is rendered conductive allowing an output pulse to appear at the first transistor.

For a clearer understanding of the invention, reference may be made to the following detailed description and the accompanying drawing in which.

Figure 1:
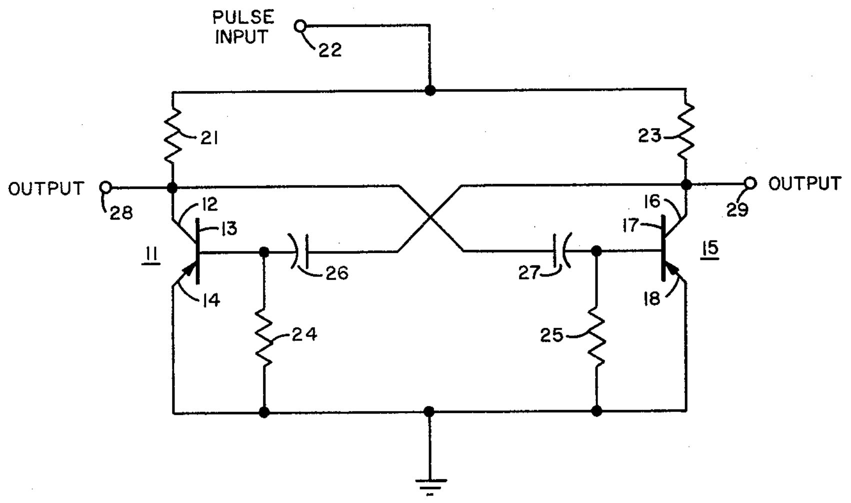
FIGURE 1 is a schematic diagram of a preferred embodiment of the invention.

Referring first to FIGURE 1, there is shown a first PNP transistor 11 having a collector 12, a base 13 and an emitter 14 and a second PNP transistor 15 having a collector 16, a base 17 and an emitter 18. The collector 12 is connected through a resistor 21 to an input terminal 22 while the collector 16 is connected through a resistor 23 to the same input terminal 22. The base 13 is connected through a resistor 24 to ground while the base 17 is similarly connected through a resistor 25 to ground. Both the emitter 14 and the emitter 18 are grounded. The base 13 is coupled by means of a capacitor 26 to the collector 16 while the base 17 is coupled by a means of a capacitor 27 to the collector 12. Output terminals

28 and 29 are connected to the collectors 12 and 16, respectively.

In the absence of an input signal, both transistors are nonconductive because there is no power supply and the bases and the emitters are both at ground potential. If now a negative pulse be applied to the input terminal 22, a negative voltage is applied to both collectors and coupled by the capacitors 26 and 27 to the two bases. The two parts of the circuit are not, of course, identical and the negative potential applied to one base will start one of the transistors, for example transistor 15, conducting. Accordingly, the collector 16 will be at approximately ground potential and no output will appear at the terminal 29. The transistor 11 will remain nonconducting and, accordingly, an output pulse will appear at the terminal 28. During the pulse the capacitor 27 will be charged negatively. At the end of the pulse the trailing edge will cause a positive going voltage to be coupled to the base 17, thereby cutting off the transistor 15 which will remain incapable of conducting until the capacitor 27 has discharged through the resistor 25. The time constants of the circuit are selected in conjunction with the frequency of the input pulses so that the next input pulse arrives before the capacitor 27 has fully discharged. Therefore, the second pulse will render the transistor 11 conductive and an output pulse will appear at the terminal 29. A similar sequence of events takes place by which the trailing edge of the second pulse cuts off the transistor 11 and the third pulse renders transistor 15 conductive.

Figure 2:
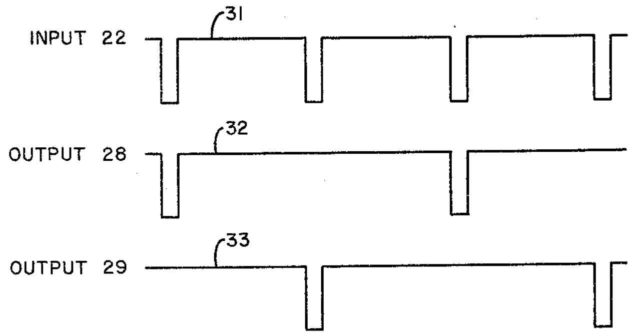
FIGURE 2 depicts several wave forms useful in explaining the invention.

The time relationship of the various pulses is shown in FIGURE 2 wherein the wave form 31 represents the input pulses. The wave form 32 represents the voltage at output terminal 28 and it can be seen that the first and third input pulses appear at terminal 28. Similarly, the wave form 33 represents the voltage at the terminal 29 and it can be seen that the second and fourth input pulses appear at the output terminal 29.

It is thus apparent that two series of output pulses are provided each having a frequency one half that of the input series, one of which is delayed with respect to the other by one input pulse period. Either series may be used as the "clock" series whereupon the other will be the "half clock" series. If desired, one half of the circuit may be made slightly different from the other half as, for example, by making the resistor 25 smaller than the resistor 24 so that initially the transistor 11 always conducts first.

While a specific embodiment has been described, many modifications can be made within the spirit of the invention. It is therefore desired that the protection afforded by Letters Patent be limited only by the true scope of the appended claims.

What is claimed is:

1. A pulse dividing circuit comprising, first and second transistors each having a base, a collector, and an emitter, means for capacitatively coupling the base of each transistor to the collector of the other transistor, means for grounding both of said emitters, first and second resistors connecting said collectors of said first and second transistors respectively to a common input point to which input pulses to be divided are applied, third and fourth resistors connecting said bases of said first and second transistors respectively to ground, and an output conductor connected to one of said collectors.

2. A pulse dividing circuit comprising, first and second transistors each having a base, a collector, and an emitter, means for connecting both of said emitters to ground, first and second resistors connected between said collectors of said first and second transistors respectively and a common point to which input pulses are applied, third and fourth resistors connected between said bases of said first and second transistors respectively and ground, a first capacitor connected between said base of said first transistor and said collector of said second transistor, a second capacitor connected between said base of said second transistor and said collector of said first transistor, the time constants of said first capacitor and said third resistor and of said second capacitor and said fourth resistor each being selected in conjunction with the frequency of the input pulses so that neither capacitor is fully discharged during the interval between pulses, and an output conductor connected to one of said collectors.

3. Apparatus according to claim 2 in which the time constant of said first capacitor and said third resistor is different from the time constant of said second capacitor and said fourth resistor.

References Cited in the file of this patent

UNITED STATES PATENTS

| | | |
|---|---|---|
| 2,399,135 | Miller et al. | Apr. 23, 1946 |
| 2,882,423 | MacSorley | Apr. 14, 1959 |
| 2,920,215 | Lo | Jan. 5, 1960 |
| 2,956,241 | Huang | Oct. 11, 1960 |